Nov. 21, 1961   F. KLEEKAMM ET AL   3,009,231
APPARATUS FOR HEAT-STRETCHING OF SYNTHETIC POLYMER THREADS
Filed June 16, 1958

INVENTORS:
FRITZ KLEEKAMM
ERHARD SIGGEL
THEO RACK
BY *Margell, Johnston, Cook & Root*

ATT'YS

United States Patent Office

3,009,231
Patented Nov. 21, 1961

3,009,231
APPARATUS FOR HEAT-STRETCHING OF SYNTHETIC POLYMER THREADS
Fritz Kleekamm, Obernburg (Main), Erhard Siggel, Laudenbach (Main), and Theo Rack, Wurzburg, Germany, assignors to Vereinigte Glanzstoff-Fabriken A.G., Wuppertal-Elberfeld, Germany
Filed June 16, 1958, Ser. No. 742,136
Claims priority, application Germany Apr. 10, 1957
18 Claims. (Cl. 28—71.3)

The invention relates to apparatus for the hot-stretching and reduction of the shrinkage of synthetic polymer threads by means of stretching members maintained at different temperatures—the invention having particular application to the hot-stretching of synthetic condensation polymer threads, particularly polyethylene terephthalate threads.

For the stretching of synthetic threads, a series of devices and processes are known in the art and operate essentially on the same basic principle—the heating of the running thread during stretching thereof between the thread feed and the drawing-off members. In one instance, a device has been proposed for the stretching of synthetic threads, which device brings about the heating in a different manner than the usual one. This mechanism consists of the usual feed and drawing-off members, in which arrangement, between the feed and drawing-off members accomplishing the stretch, the thread comes into contact only with one adjustable electric heating device, by which the thread is deflected from the straight line at an adjustable angle. According to another proposal, threads of synthetic thread-forming material, especially of polyethylene terephthalate, are conducted around a heated, nonrotating spreader bar, in which arrangement the thread softens in contact with this heated bar, whereupon it is conducted further over a heated surface and is thereon maintained under a stretch tension to complete the stretch. It is generally recognized that the quality of the textile threads, especially the strength and the tendency thereof toward shrinkage, can be considerably influenced by the type of stretching. Not only is the arrangement and mode of operation of the stretching device important, but also the temperature differences between the individual stretching members used during the stretching process appear to be important. In the devices known prior to the instant invention, the temperatures cannot always be maintained constant within an extremely small range.

It was found in accordance with the instant invention that in the hot-stretching of synthetic threads, especially of those of polyethylene terephthalate, the temperature differences between the stretching members can be maintained constant within a very narrow range. The heating apparatus of the invention is situated between feed and drawing-off members whose rates of feed and draw-off control the stretch. The heating apparatus is a metal block which can be heated by a single heat source. In the embodiments illustrated, the metal block is heated by a tube running through the metal block—the tube being used to carry a heated fluid through the block for heating the latter. The block is made up partially or entirely of a metal which has a high heat-conduction capacity, i.e., a high coefficient of thermal conductivity. Two metal fingers are set in the metal block, which, for convenience of description, will be designated in correspondence with their function in the stretching of the threads as a stretching finger and a fixing finger. The unstretched thread is delivered from a supply source such as a bobbin first to the stretching finger and then at the fixing finger, in which arrangement it is stretched and then fixed. One means to accomplish this temperature differential is in the manufacture of the two fingers of metals of materially different thermal conductivity so that the fixing finger is composed of a metal of high heat-conducting capacity, as, for example, of the same metal as the metal block while the stretching finger is composed of a metal of materially lower heat-conducting capacity. It is thereby possible to keep the stretching finger at considerably lower temperatures than those of the fixing finger, although both fingers are mounted on a common metal block, which is maintained at a predetermined temperature and from which both fingers derive their heat. A second means for the achievement of temperature differences in the two fingers is in the physical construction thereof by making the cross-sectional area of the part of the metal finger which is set in the metal block different, that is, smaller or larger than that of the other metal finger. In this construction, the quantitative heat conductance through the finger mounting of smaller cross-sectional area can be made materially less than the quantity of heat transferred through the finger mounting of greater cross-sectional area. It is within the contemplation of this invention to use in a single embodiment both a different metal for each finger and a different cross-sectional area for each finger mounting in the manner hereinafter described.

For the use of the fixing finger and also of the metal block, all metals are suitable which have a relatively good coefficient of heat conduction and whose thermal conductivity coefficient ($\lambda_{20}$° C.—calories/cm. sec. degree C.) is over 0.4 and preferably over 0.5. Copper ($\lambda_{20}=0.94$), silver ($\lambda_{20}=1.00$) and also aluminum ($\lambda_{20}=0.53$) are especially suitable for this purpose. For the use of the stretching finger, according to the embodiments of the invention, a metal is used, whose heat conduction capacity is relatively lower than that of the metals mentioned above and whose coefficient of thermal conductivity ($\lambda_{20}$) lies below 0.5, preferably below 0.2. In this category there are, among others, wrought iron ($\lambda_{20}=0.14$), Bessemer steel ($\lambda_{20}=0.096$), chromium steel ($\lambda_{20}=0.047$), nickel steel ($\lambda_{20}=0.026$). The foregoing metals are only examplary of metals and alloys which may be employed in the practice of the invention. Other suitable metals and alloys having adequate structural strength may be substituted for the foregoing metals without departing from the spirit of the invention herein defined.

A third means for keeping the two fingers at different temperatures is the construction of the metal heating block in two joined segments, one segment, which is in heat-conducting contact with the heating source, viz., the heating tube, being of a metal of high heat conduction capacity and the other segment being of a metal of materially lower heat conduction capacity. In preferred forms of this general embodiment, the cross-sectional area perpendicular to heat flow therethrough of the latter segment is materially less than the cross-sectional area of the other segment. The fixing finger is mounted in the first-mentioned segment, and the stretching finger is mounted in the segment of lower heat conduction capacity—a difference in temperature between the two fingers being made possible by the differences in heat conductance capacities of the two segments of the metal block because of the different metals and also the differences in cross-sectional areas perpendicular to heat transfer.

The heating block, in accordance with this last-mentioned embodiment, is made of a metal block segment having a relatively high coefficient of heat conduction and whose thermal conductivity coefficient ($\lambda_{20}$) is over 0.4 and preferably over 0.5 and a segment welded, brazed, or otherwise metal-metal bonded thereto in heat-conducting relationship, the latter segment composed of a metal whose heat conduction capacity is relatively lower than the segment previously described—having a thermal conductivity coefficient below 0.5, and preferably below 0.2—and preferably also having a cross-sectional area of the metal, perpendicular to the direction of heat transfer or heat flow, substantially less than the corresponding cross-sectional area of the first-mentioned segment. Reference is made to the metals previously enumerated with respect to the two fingers for metals from which the heating block segments may be made.

It is within the contemplation of this invention to obtain differences in temperatures of the fingers mounted in these heating block segments solely by the differences in metals constituting the heating block, alone or in combination with the aforesaid differences in cross-sectional area of the two segments. In this instance, the stretching finger and the fixing finger will be made of the same metal and have the same cross-sectional area in the finger portions extending into and mounted in the heating block segments. It is also within the scope of the invention to use this type of heating block construction in combination with stretching and fixing fingers having different cross-sectional area or being made of different metals in accordance with the previous description of the invention.

From the foregoing, it will be seen that the difference in quantities of heat delivered from the heating block to the two metal fingers can be controlled by (a) a difference in thermal conductivity coefficients in the different metals of the two fingers and/or (b) a difference in cross-sectional area between the finger portions extending into the metal block and/or a difference in thermal conductivity coefficients in the different metals constituting the heating block segments with or without a difference in cross-sectional area, perpendicular to heat flow, between the two segments of the heating block—each alone or in combination contributing to the differences in quantitative heat conductance from the block to the heating surfaces of the fingers. Where only small temperature differentials between the fingers are desired, i.e., about 20° C. or less, the invention may take the form of finger mountings in the heating block of equal or substantially equal cross-sectional area (about a 1:1 ratio) with the fingers or the heating block segments being made of different metals or alloys wherein the difference between thermal conductivity coefficients ($\lambda_{20}$) of the two metals or alloys is at least about 0.4 and preferably at least 0.8 for most instances. Larger temperature difference can be achieved by differences between the cross-sectional area of the finger mounting segments in the metal block and/or the block segments wherein the ratio of the cross-sectional area of the mounting segment of the fixing finger to the cross-sectional area of the mounting segment of the stretching finger and/or the ratio of the cross-sectional area of the segment of the heating block made of a metal of higher thermal conductivity to the corresponding cross-sectional area of the other segment may be as high as 200:1. In most cases, particularly where relatively large temperature differentials are desired, the invention can best be practiced, from the viewpoint of simplicity of construction and adequate strength of construction, by utilizing metal fingers which are different both in thermal conductivity coefficients and in cross-sectional areas of the finger mounting segments such as a ratio for the latter of 2:1 to 200:1, the larger area being that of the projection of higher thermal conductivity; by utilizing a heating block composed of segments of metals which are both different in thermal conductivity coefficients with or without differences in corresponding cross-sectional areas; or by combinations of these differences in heating block and metal finger construction.

Specific embodiments of the invention are illustrated in the drawing wherein.

Figure 1:
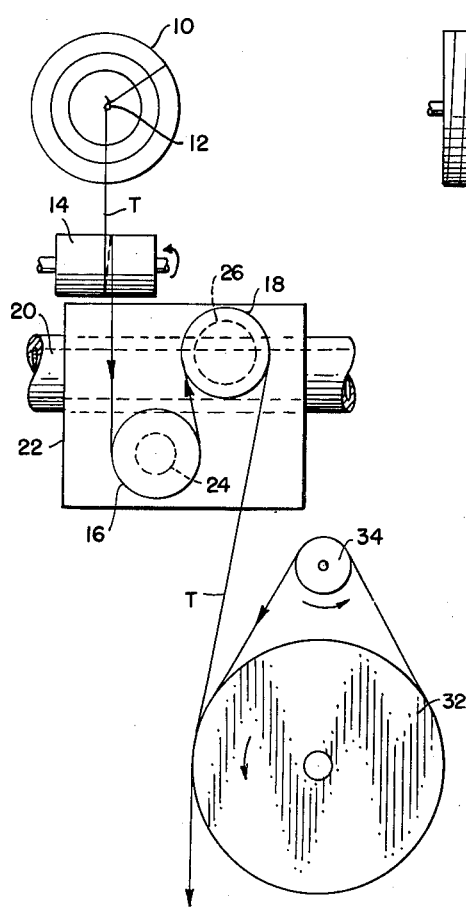
FIG. 1 is a semidiagrammatic front elevation of the embodiment.
Figure 2:
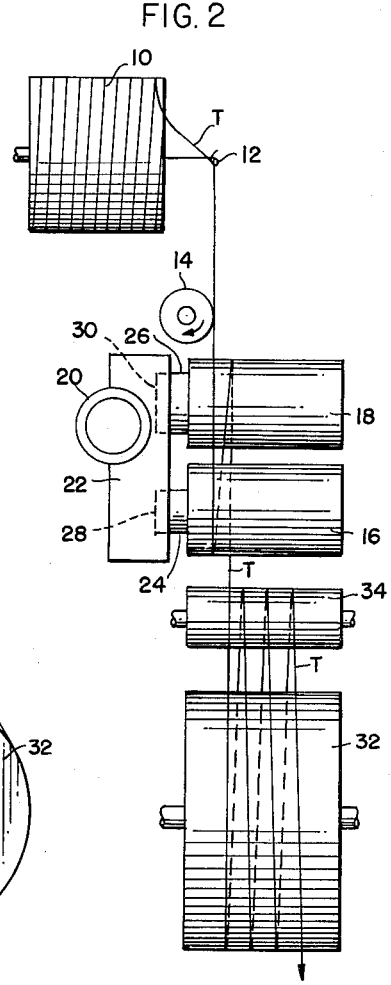
FIG. 2 is a semidiagrammatic side view of the embodiment of FIG. 1.

Referring to FIGS. 1 and 2 of the drawing, the apparatus illustrated is a combination of a thread supply source, a device for drawing off the thread from the supply source, a heated block having two heated fingers over the surface of which thread passes, and a second drawing-off device for drawing off the thread from the heated block fingers.

The unstretched thread T is drawn from a supply source, in this instance a bobbin 10, through a guide eye 12 by a rotatably driven roller 14 around which the thread is looped in one or more loops. The thread passes over cylindrical, fixed protrusions or fingers 16, 18 which are heated by heat conduction from a heated fluid such as steam or liquid dowtherm, an eutectic mixture of diphenyl and diphenyl oxide, conducted through a tube 20 of a metal of high thermal conductivity, copper in this instance, which tube in turn is mounted in a metal heating block 22. The heat transferred from the tube 20 to the metal heating block 22 is in turn conducted to the fingers or projections 16, 18 through cylindrical segments 24, 26 integral with the main body of fingers 16, 18, respectively, and mounted rigidly in contact with the walls of drilled holes 28, 30 in the metal block 22. In the embodiment shown, both fingers are self-supporting, but it is possible to construct the segment 24 of such a small diameter that additional support is necessary for the finger 16 in order that it have adequate rigidity.

The finger or projection 16 and its segment 24 in the embodiment illustrated is a solid body of a metal having a thermal conductivity coefficient ($\lambda_{20}$) materially less than 0.50, preferably below 0.2, such as wrought iron, steel, chromium steel, nickel steel, etc. The segment 24 is of a materially lesser diameter than the diameter of segment 26. The cylindrical projection 18 and its integral segment 26 is a solid body of a metal having a thermal conductivity coefficient ($\lambda_{20}$) of at least about 0.50, such as silver, copper, or aluminum. The segment 26 may be made of equal diameter with the main body of the finger 18, or it may be slightly smaller, as illustrated.

The thread T, passing over the heated surfaces of fingers 16, 18, is drawn off at a more rapid rate than it is supplied by a pair of cylindrical rollers 32, 34 in a plurality of laterally advancing loops thereover—the roller 32 being rotatably driven. Thereafter, the stretched thread is spooled in the usual manner.

Figure 3:
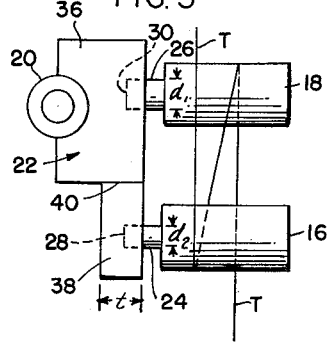
FIG. 3 is a side elevation of another embodiment of a heating block adapted to be used in the combination shown in FIGS. 1 and 2.
Figure 4:
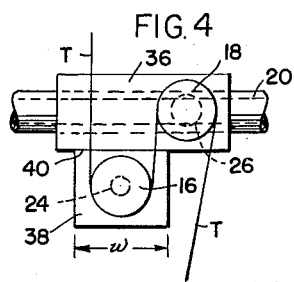
FIG. 4 is a front elevation of the heating block of FIG. 3.

Turning to FIGS. 3 and 4, the heating block 22 is of the same general combination as the heating block of FIGS. 1 and 2. Accordingly, where possible, like numerals have been used to designate like parts, and reference is made to the previous description of the invention for their explanation. The heating block of FIGS. 3 and 4 differs essentially from that of FIGS. 1 and 2 in that, instead of being made of a single type of highly heat conductive metal, the heating block of FIGS. 3 and 4 is made of an upper segment 36 of a metal of high thermal conductivity—having a thermal conductivity coefficient ($\lambda_{20}$) of at least 0.4 and preferably at least 0.5, e.g., copper, silver, or aluminum—and a metal lower segment 38 having substantially lower heat conductance capacity, the thermal conductivity coefficient ($\lambda_{20}$) being below 0.5 and preferably below 0.2. The lower segment 38 is brazed or welded to the upper segment 36 to provide a heat-conducting union 40 between the segments.

The lower segment 38 may have a thickness $t$ which is substantially less than the thickness of the upper segment where relatively large temperature differences are desired or it may be of equal thickness with the segment 36. Similarly, the width $w$ of the lower segment may be the same as or different from the width of the upper segment. By reducing the dimensions of the lower segment, one can attain greater temperature differences in the fingers as well as save in amounts of metal used in the lower segment 38. Further, the lower segment 38 may be a hollow, thin-walled body having the mounting segment 24 of finger 16 secured in the rear and front walls thereof. This construction provides a means for effectively reducing the cross-sectional area of heat conduction through the metal in the lower segment.

In this embodiment, the fingers 16 and 18 may be made of the same metal, such as a metal of high thermal conductivity, e.g., copper or aluminum, or the metals of the fingers may differ in accordance with the description thereof with respect to FIGS. 1 and 2. Also, the cross-sectional areas, or the diameters $d_1$ and $d_2$ in the illustrated embodiments of the mounting segments 24 and 26 may be the same, or they may also differ in accordance with the description with respect to FIGS. 1 and 2. The choice will depend on how great a difference in temperature of the fingers is desired. It is possible to arrive at a given temperature difference by several different ways. In a preferred form, in accordance with this embodiment of the invention, the cross-sectional areas of the finger mounting segments 24 and 26 will be the same and preferably the metals of the two fingers 16 and 18 will be the same.

In a specific illustration of the invention herein contemplated, the copper tube 20 is heated with liquid dowtherm at 165° C. The tube has an inside diameter of about 35 mm. Brazed to this tube is a rectangularly shaped, solid metal block 22 of high heat conductance, in the present illustration, copper ($\lambda_{20}=0.94$). The size of the block 22 is 65 x 55 x 27 mm. In the metal block and projecting from one side thereof, fingers or projections 16, 18 are inset. The cylindrical metal finger designated as stretching finger 16 is made of wrought iron ($\lambda_{20}=0.14$). The cross-sectional area of the segment 24 of the stretching finger 16, which segment is inset in the heated metal block 22, is 53.5 mm.² The main body of the finger 16, however, is larger so its diameter is the same as the diameter of the fixing finger 18 to be described in the following. The stretching finger is provided on the outside with a thin, dull chromium protective coating. This stretching finger, because of the low thermal conduction coefficient of iron ($\lambda_{20}=0.14$) and also because of the relatively small cross-section of the segment 24, has a surface temperature of 104° C. The second metal finger, here called the fixing finger 18, is composed of copper ($\lambda_{20}=0.94$) and has a constant cross-section of 805 mm.² (no segment 26 of lesser diameter). It is inset in the metal block 22 and provided with a thin, dully chrome plated, interchangeable, protective covering. This copper finger has substantially the same temperature as the metal block, similarly composed of copper, which temperature can be adjusted by the temperature of the heating fluid in tube 20 to the desired fixing temperature. This temperature, in the present case is 156° C. The thread T, fed from the bobbin 10 at a low speed in unstretched state first passes once or twice around the heated stretching finger 16, the temperature of which is 104° C., and from here it is then conducted to the fixing finger 18 which is mounted above the other finger and is at a higher temperature (156° C.), at a rate to impart a stretching of about 370% to the thread on the stretching device. On the fixing finger itself a slight additional stretching of the thread takes place, by which the thread is reduced in its boiling shrinkage of 18% to about 5.7%. The stretched thread, continuously drawn off by the drawing-off rollers 32, 34, is spooled in the usual manner.

It is also possible, with the employment of the same arrangement, to maintain the temperature of the liquid dowtherm at, say, 200° C. In this case the temperature of the iron stretching finger 16 is 125°, while the temperature of the copper fixing finger is 187° C. If, however, in this case the stretching finger 16 is composed of chromium steel ($\lambda_{20}=0.047$), then the temperature under similar circumstances of this finger is about 105° C. In the same arrangement, but with a temperature of liquid dowtherm of 220° C., the temperature for the copper fixing finger 18 is 202° C., and for the iron stretching finger 16 it is 132° C. If, however, the stretching finger 16 consists of V4A-steel, then the temperature in this case is only 85° C.

On the basis of the foregoing disclosure, one can arrive at one of many differing temperature combinations. The desired temperature conditions for a given combination, once equilibrium is attained, can be maintained within a very narrow range for a long time.

To summarize, the temperature difference between heated fingers can be achieved firstly by employing metals with differing heat conductance as the stretching finger and for the fixing finger and/or by making the heating block 22 in segments of metals having different thermal conductivity coefficients. Another means of further achieving the temperature differences is in the design of the fixing finger in relation to the stretching finger, at the heat transfer point between metal fingers and metal block, such that the cross-sectional area of the fixing finger segment and the stretching finger segment at said heat transfer point, are in a range of from 1:1 to 200:1, respectively. Through this different nature of the cross-sectional areas, broad ranges of temperature differences can be attained. A still further means is the construction of the heating block of segments having different effective heat-conducting cross-sectional areas in the embodiments of the invention where metals of different thermal conductivity are used to make up the heating block.

In the heat-stretching of polyethylene terephthalate, the temperature of the stretching finger will fall within the range of about 80–135° C., and the temperature of the fixing finger will be in the range of 150–220° C., preferably 180–210° C.

The primary advantage of the present invention is that the necessary differing temperatures for stretching can be maintained with extreme precision with an apparatus of simple construction. According to the devices known heretofore, it was necessary to heat the surfaces used for the stretching and for the fixing separately, so that for a heat stretching operation two heat sources were always necessary. For these two heat sources, separate control devices are necessary. Thus, the present invention provides a great simplification of the heating device. For example, the heated tube 20 may have mounted thereon more than 70 similar heating blocks 22 with fingers 16, 18, which are heated from only a single heat source—each having fixing fingers and stretching fingers substantially identical in temperature with the corresponding fingers on the other block assemblies. This arrangement means a considerable advance over the stretching arrangements ordinarily used.

The invention previously described may take many forms other than those herein described. Other drawing-off devices than the rollers 14 and 32, 34 may be employed in the practice of the invention. The metal block 22 and the cylindrical fingers 16, 18 may take other shapes or may be made of other heat-conducting materials than the metals and alloys specifically enumerated, and the metal block 22 may be heated by other means than a heated fluid. Also, the exposed surfaces of the tube 20 and the metal block may be covered with an insulation to minimize heat loss and/or heat radiation. Thus, though the embodiments of the invention previously described constitute our preferred forms for practice of the generic invention herein disclosed, other modifications and variations of the invention herein taught may be employed without departing from the spirit and scope of the invention hereinafter claimed.

This application is a continuation-in-part application of our copending application Serial No. 727,158, filed April 8, 1958, now abandoned.

The invention is hereby claimed as follows:

1. In a device for heat-stretching synthetic polymer threads, means for supplying thread to be heat-stretched, means for drawing off thread at a more rapid rate than the rate at which the thread is supplied, a metal block of high heat conductivity mounted in the path of thread travel between said means, means for heating said metal block, and first and second metal projections providing thread-contact surfaces mounted on said block, each projection having a heat conducting segment thereof in contact with said metal block, the said segment of said first metal projection having a markedly lower quantitative heat conductance capacity than the said segment of said second metal projection such that the projections heated by a common heating means via said block have markedly different thread-contacting surface temperatures.

2. In a device for heat-stretching synthetic polymer threads, means for supplying thread to be heat-stretched, means for drawing off thread at a more rapid rate than the rate at which the thread is supplied, a metal block of high heat conductivity mounted in the path of thread travel between said means, means for heating said metal block, and first and second projections providing thread-contact surfaces mounted on said block with heat conducting segments thereof in contact with said metal block, said second projection being made of a metal having a thermal conductivity coefficient markedly greater than the thermal conductivity coefficient of the metal of the first projection.

3. In a device for heat-stretching synthetic polymer threads, means for supplying thread to be heat-stretched, means for drawing off thread at a more rapid rate than the rate at which the thread is supplied, a metal block of high heat conductivity mounted in the path of thread travel between said means, means for heating said metal block, and first and second projections providing thread-contact surfaces mounted on said block with heat conducting segments thereof in contact with said metal block, said second projection being made of a metal having a thermal conductivity coefficient ($\lambda_{20}$) of at least 0.5 and at least 0.4 greater than the thermal conductivity coefficient ($\lambda_{20}$) of the metal of the first projection.

4. In a device for heat-stretching synthetic polymer threads, means for supplying thread to be heat-stretched, means for drawing off thread at a more rapid rate than the rate at which the thread is supplied, a metal block of high heat conductivity mounted in the path of thread travel between said means, means for heating said metal block, and first and second metal projections providing thread-contact surfaces mounted on said block with heat-conducting segments thereof in contact with said metal block, said second projection being made of a metal having a thermal conductivity coefficient ($\lambda_{20}$) of at least 0.8 and the first projection being made of a metal having a thermal conductivity coefficient ($\lambda_{20}$) less than 0.2.

5. The combination of claim 1 wherein the ratio of the cross-sectional area of said segment of the second projection in heat-conducting contact with said metal block to the corresponding cross-sectional area of said segment of the first projection is at least 2:1 and not greater than 200:1.

6. The combination of claim 4 wherein the ratio of the cross-sectional area of the segment of the second projection in heat-conducting contact with said metal block to the corresponding cross-sectional area of the segment of the first projection is at least 2:1 and not greater than 200:1.

7. A thread-heating and fixing device comprising a metal block of high heat conductivity, means for heating said metal block, and first and second metal projections providing thread-contact surfaces mounted on said block, each projection having a heat conducting segment thereof in contact with said metal block, the said segment of said first metal projection having a markedly lower quantitative heat conductance capacity than the said segment of said second metal projection such that the projections heated by a common heating means have markedly different thread-contacting surface temperatures.

8. A thread-heating and fixing device comprising a metal block of high heat conductivity, means for heating said metal block, and first and second metal projections providing thread-contact surfaces mounted on said block with heat-conducting segments thereof in contact with said metal block, said second projection being made of a metal having a thermal conductivity coefficient markedly greater than the thermal conductivity coefficient of the metal of the first projection.

9. A thread-heating and fixing device comprising a metal block of high heat conductivity, means for heating said metal block, and first and second metal projections providing thread-contact surfaces mounted on said block with heat-conducting segments thereof in contact with said metal block, said second projection being made of a metal having a thermal conductivity coefficient ($\lambda_{20}$) of at least 0.5 and at least 0.4 greater than the thermal conductivity coefficient of the metal of the first projection.

10. A thread-heating and fixing device comprising a metal block of high heat conductivity, means for heating said metal block, and first and second metal projections providing thread-contact surfaces mounted on said block with heat-conducting segments thereof in contact with said metal block, said second projection being made of a metal having a thermal conductivity coefficient ($\lambda_{20}$) of at least 0.8 and the other projection being made of a metal having a thermal conductivity coefficient ($\lambda_{20}$) less than 0.2.

11. The combination of claim 7 wherein the ratio of the cross-sectional area of said segment of the second projection in heat-conducting contact with said metal block to the corresponding cross-sectional area of said segment of the just projection is at least 2:1 and not greater than 200:1.

12. The combination of claim 9 wherein the ratio of the cross-sectional area of said segment of the second projection in heat-conducting contact with said metal block to the corresponding cross-sectional area of said segment of the first projection is at least 2:1 and not greater than 200:1.

13. A device for heating and fixing threads in a heat-stretching process comprising a metal block of high heat conductivity, means for heating the metal block, first and second fingers, each having a thread-heating surface, mounted on said block and extending outwardly from a surface thereof, the heating means and the thread-heating surface of the second finger being in thermal conductance connection through a metal body having a high heat conductance capacity and the thread-heating surface of the first finger being in thermal conductance connection with said heating means through a metal body having a substantially lower heat conductance capacity.

14. The device of claim 13 wherein the first-mentioned metal body has a thermal conductivity coefficient ($\lambda_{20}$) of at least 0.8 and the second-mentioned metal body has a thermal conductivity coefficient ($\lambda_{20}$) of less than 0.2.

15. In a device for heat-stretching synthetic polymer threads, means for supplying thread to be heat-stretched, means for drawing off thread at a more rapid rate than the rate at which thread is supplied, a metal block having a first segment made of a metal having a thermal conductivity coefficient ($\lambda_{20}$) of at least 0.5 and a second segment bonded thereto in heat-conducting relationship of a metal having a thermal conductivity coefficient ($\lambda_{20}$) of less than about 0.2, and a metal projection providing a thread contacting surface extending from each segment in heat-conducting relationship therewith, and means in said first-mentioned segment for heating said metal block.

16. The combination of claim 15 wherein the ratio of the cross-sectional area of the first-mentioned segment to the cross-sectional area of the second-mentioned segment is at least 2:1 and not greater than 200:1.

17. A thread-heating and fixing device comprising a metal block having a first segment made of a metal having a thermal conductivity coefficient ($\lambda_{20}$) of at least 0.5 and a second segment bonded thereto in heat-conducting relationship of a metal having a thermal conductivity coefficient ($\lambda_{20}$) of less than about 0.2, and a metal projection providing a thread-contacting surface extending from each segment in heat-conducting relationship therewith, and means in said first-mentioned segment for heating said metal block.

18. The combination of claim 17 wherein the ratio of the cross-sectional area of the first-mentioned segment to the cross-sectional area of the second-mentioned segment is at least 2:1 and not greater than 200:1.

References Cited in the file of this patent

UNITED STATES PATENTS

| | | |
|---|---|---|
| 2,455,173 | Hitt | Nov. 30, 1948 |
| 2,509,741 | Miles | May 30, 1950 |
| 2,533,013 | Hume | Dec. 5, 1950 |
| 2,622,182 | Forzley et al. | Dec. 16, 1952 |
| 2,624,934 | Munson et al. | Jan. 13, 1953 |

UNITED STATES PATENT OFFICE
CERTIFICATE OF CORRECTION

Patent No. 3,009,231                      November 21, 1961

Fritz Kleekamm et al.

It is hereby certified that error appears in the above numbered patent requiring correction and that the said Letters Patent should read as corrected below.

Column 7, line 33, after "second" insert -- metal --; column 8, line 35, for "just" read -- first --.

Signed and sealed this 1st day of May 1962.

(SEAL)
Attest:

ERNEST W. SWIDER
Attesting Officer

DAVID L. LADD
Commissioner of Patents